(12) United States Patent
Dezeustre et al.

(10) Patent No.: US 9,458,793 B2
(45) Date of Patent: Oct. 4, 2016

(54) THRUST REVERSER FOR AN AIRCRAFT JET ENGINE

(71) Applicant: AIRCELLE, Gonfreville l'Orcher (FR)

(72) Inventors: Nicolas Dezeustre, Le Havre (FR); Olivier Kerbler, Antony (FR); Herve Hurlin, Igny (FR); Pierre Moradell-Casellas, Saint Georges des Groseillers (FR)

(73) Assignee: AIRCELLE, Gonfreville l'Orcher ( * ) Notice: Subject to any disclaimer, the term of this patent is extended or adjusted under 35 U.S.C. 154(b) by 203 days.

(21) Appl. No.: 14/048,206

(22) Filed: Oct. 8, 2013

(65) Prior Publication Data

US 2014/0061332 A1    Mar. 6, 2014

Related U.S. Application Data

(63) Continuation of application No. PCT/FR2012/050796, filed on Apr. 12, 2012.

(30) Foreign Application Priority Data

Apr. 14, 2011    (FR) ...................................... 11 01160

(51) Int. Cl.
*F02K 1/72*    (2006.01)
*F02K 1/76*    (2006.01)
(Continued)

(52) U.S. Cl.
CPC ............... *F02K 1/763* (2013.01); *F02K 1/625* (2013.01); *F02K 1/64* (2013.01); *F02K 1/72* (2013.01); *F05D 2250/34* (2013.01); *Y02T 50/672* (2013.01)

(58) Field of Classification Search
CPC ............ F02K 1/763; F02K 1/72; F02K 1/54; F02K 1/605; F02K 1/625; F02K 1/64; F05D 2250/34; Y02T 50/672
USPC ........ 60/770, 771, 226.1, 226.2, 226.3, 228; 239/265.11, 265.19, 265.33; 244/54
See application file for complete search history.

(56) References Cited

U.S. PATENT DOCUMENTS

| | | | |
|---|---|---|---|
| 3,500,644 A * | 3/1970 | Hom | F02K 1/72 239/265.29 |
| 3,503,211 A | 3/1970 | Medawar et al. | |
| 3,820,719 A * | 6/1974 | Clark | F02K 1/66 239/265.31 |

(Continued)

FOREIGN PATENT DOCUMENTS

| | | |
|---|---|---|
| EP | 1239139 A1 | 9/2002 |
| EP | 1286037 A1 | 2/2003 |

(Continued)

OTHER PUBLICATIONS

International Search Report issued Jul. 9, 2012 in International Application No. PCT/FR2012/050796.

*Primary Examiner* — Steven Sutherland
(74) *Attorney, Agent, or Firm* — Burris Law, PLLC (57) ABSTRACT

An assembly includes a suspension pylon and a thrust reverser which has vanes for deflecting flow and a cowl able to move between an open position and a closed position by an actuator. The thrust reverser further includes rails able to slide in slideways. In particular, the actuator is disposed in line with a corresponding rail. The actuator may be an actuator having a rotating nut connected to an endless screw or an actuator suitable for pulling on the corresponding rail or on the corresponding slideway.

15 Claims, 4 Drawing Sheets

(51) Int. Cl.
*F02K 1/62* (2006.01)
*F02K 1/64* (2006.01)

(56) References Cited

U.S. PATENT DOCUMENTS

| | | | |
|---|---|---|---|
| 4,998,409 A * | 3/1991 | Mutch | F02K 1/72 239/265.29 |
| 5,211,008 A * | 5/1993 | Fage | F02K 1/74 239/265.19 |
| 6,340,135 B1 | 1/2002 | Barton | |
| 7,484,356 B1 * | 2/2009 | Lair | F02K 1/72 60/226.2 |
| 8,464,512 B2 * | 6/2013 | Vauchel | B64D 29/06 239/265.11 |

FOREIGN PATENT DOCUMENTS

| | | |
|---|---|---|
| FR | 2916426 A1 | 11/2008 |
| FR | 2921976 A1 | 4/2009 |
| WO | 2009/147333 A1 | 12/2009 |
| WO | 2012/059677 A2 | 5/2012 |

* cited by examiner

THRUST REVERSER FOR AN AIRCRAFT JET ENGINE

CROSS-REFERENCE TO RELATED APPLICATIONS

This application is a continuation of International Application No. PCT/FR2012/050796, filed on Apr. 12, 2012, which claims the benefit of FR 11/01160, filed on Apr. 14, 2011. The disclosures of the above applications are incorporated herein by reference.

FIELD

The present disclosure relates to a thrust reverser for an aircraft jet engine.

BACKGROUND

The statements in this section merely provide background information related to the present disclosure and may not constitute prior art.

An airplane is moved by several jet engines each housed in a nacelle serving to channel the flows of air created by the jet engine that also houses a set of actuating devices performing various functions, when the jet engine is running or stopped.

These actuating devices may in particular comprise a mechanical thrust reversal system.

The nacelle generally has a tubular structure comprising an air intake upstream from the jet engine, a middle section designed to surround a fan of the jet engine, and a downstream section housing thrust reversal means and designed to surround the combustion chamber of the jet engine, and generally ends with a jet nozzle whereof the outlet is situated downstream from the jet engine.

Modern nacelles are designed to house a dual flow jet engine capable of creating, through the blades of the fan, a flow of air whereof one portion, called hot or primary flow, circulates in the combustion chamber of the jet engine, and the other portion of which, called cold or secondary flow, circulates outside the jet engine through an annular passage, also called a tunnel, formed between the fairings of the jet engine and the inner walls of the nacelle. The two flows of air are ejected from the jet engine through the rear of the nacelle.

The role of a thrust reverser is, during landing of an airplane, to improve the braking capacity thereof by reorienting at least part of the thrust created by the jet engine forward. In this phase, the reverser obstructs the cold flow tunnel and orients that flow toward the front of the nacelle, thereby creating a counter-thrust that is added to the braking of the wheels of the airplane.

The means used to perform this reorientation of the cold flow vary depending on the type of reverser. However, in all cases, the structure of a reverser comprises movable cowls that can be moved between a closed or "direct jet" position, in which they close said passage, and an open or "reverse jet" position, in which they open a passage intended for the deflected flow in the nacelle. These cowls may perform a deflection function or simply serve to activate other deflecting means.

In the case of a grid reverser, also called a cascade thrust reverser, the flow of air is reoriented by cascade vanes, the cowl serving only to slide so as to expose or cover said vanes.

The moving cowl is translated along a longitudinal axis substantially parallel to the axis of the nacelle. Optionally, thrust reverser flaps, actuated by the sliding of the cowl, allow obstruction of the cold flow tunnel downstream from the cascade vanes, so as to optimize the reorientation of the cold flow toward the outside of the nacelle.

Known from the prior art, and in particular from document FR 2,916,426, is a grid reverser whereof the moving cowl is a single piece and slidably mounted on guideways positioned on either side of the suspension pylon for the assembly formed by the jet engine and its nacelle.

"Single-piece cowl" refers to a quasi-annular cowl extending from one side of the pylon to the other without interruption.

Such a cowl is often referred to as an "O-duct", referring to the shroud shape of such a cowl, as opposed to a "D-duct", which in fact comprises two half-cowls each extending over a half-circumference of the nacelle.

The sliding of an O-duct cowl between its "direct jet" and "reverse jet" positions is traditionally done by a plurality of actuators, for example of the mechanical-electrical or hydraulic type, for example.

Typically, there are four or six actuators, i.e., respectively two or three actuators distributed on each half of the thrust reverser, on either side of the suspension pylon and mounted on the front frame of the thrust reverser.

To bear the forces transmitted by said actuators, it is in particular possible to provide reinforcing structures, for example at the fastenings of the cylinders on the moving cowl, such as the presence of fittings, the use of thickened composite panels and more dense sandwich structure cores.

However, these structures make the thrust reverser heavier.

Such an assembly is also faced with other drawbacks.

Thus, grouping the actuators together in the upper part of the circumference of the thrust reverser risks posing difficulties resulting from the tilting torques created by the forces generated by said actuators during opening and closing of the cowl.

This position of the cylinders may generate jamming phenomena in the sliding rails of the cowl, due to their circumferential offset relative to said rails.

SUMMARY

The present disclosure provides a thrust reverser comprising vanes for deflecting flow and a cowl able to move between an open position releasing said deflecting vanes and a closed position covering said deflecting vanes and furthermore comprising rails able to slide in slideways, the rails being mounted directly or indirectly on said cowl and the slideways being mounted directly or indirectly on either side of the suspension pylon or vice versa.

This thrust reverser is remarkable in that it comprises at least one actuator able to slide the cowl between its open and closed positions, the actuator being disposed in line with the corresponding rail, said actuator being:

either an actuator having a rotating nut connected to an endless screw, for sliding the corresponding rail or corresponding slideway, as the case may be, or an actuator suitable for pulling on the corresponding rail or on the corresponding slideway, as the case may be.

The type of actuators and their particular position makes it possible to reduce the tilting movement of the movable cowl due to the forces exerted by the actuators in their traditional position tending to misalign the rails with respect to the slideways, and to thereby avoid their mutual jamming.

According to other optional features of the thrust reverser according the present disclosure, considered alone or in combination:

the slideways or the rails, as the case may be, are formed on a profile fixed to the pylon forming a base of the pylon, or on the pylon;

each actuator having a rotating nut comprises an endless screw connected to an upstream end of the corresponding rail of the movable cowl or the corresponding slideway, as the case may be, and a nut engaged with said endless screw, said nut being able to rotate around the longitudinal axis of the reverser under the action of a driving motor and the endless screw being capable of translating along said longitudinal axis, its movement being provided by the rotation of said nut;

each rotating nut may be driven by a dedicated driving motor;

the assembly formed by the driving motor and the nut is mounted in the profile fixed to the pylon or in the pylon itself;

the assembly formed by the endless screw and the driving motor may be mounted on the cowl;

a single driving motor is capable of driving the nuts of several actuators;

each actuator capable of pulling on the corresponding rail or on the corresponding slideway, as the case may be, to slide the cowl between its open and closed positions comprises at least one upstream pulley and one downstream pulley respectively mounted on either side of the corresponding rail or the corresponding slideway, as the case may be, each pulley being capable of rotating along an axis that may be perpendicular to the longitudinal axis of the nacelle under the action of at least one driving motor, and a movement transmission element suitable for transmitting the rotational movement from the pulleys to said rail or to said slideway, as the case may be;

the pulleys and the driving motor(s) are mounted in the profile fixed to the pylon or directly to the suspension pylon;

the pulleys and the driving motor(s) are mounted in the cowl;

a single driving motor is capable of driving the upstream and/or downstream pulleys of several actuators;

the driving motor(s) may indifferently drive the upstream or downstream pulleys of one and/or several actuators;

the movable cowl is a single piece;

the reverser may furthermore comprise thrust reverser flaps, arranged so as to exert a thrust force on an upstream edge of an inner wall of said moving cowl.

The present disclosure also relates to an aircraft jet engine nacelle remarkable in that it comprises a thrust reverser as described above.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 11 is an enlarged view of area C in FIG. 10a;

FIG. 12 is a cross-sectional view of the connection between a rail and a screw of the actuator of FIG. 10a;

FIG. 13 is a perspective view of an alternative form of the actuator illustrated in FIG. 10a;

In all of these figures, identical or similar references designate identical or similar members or sets of members.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
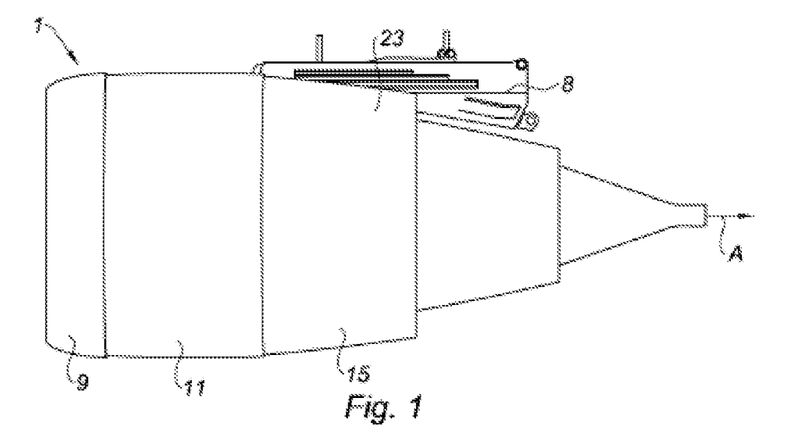
FIG. 1 is an overall diagrammatic illustration of a jet engine nacelle having a thrust reverser according to the present disclosure including a single-piece movable cowl (of the "O-duct" type)
Figure 2:
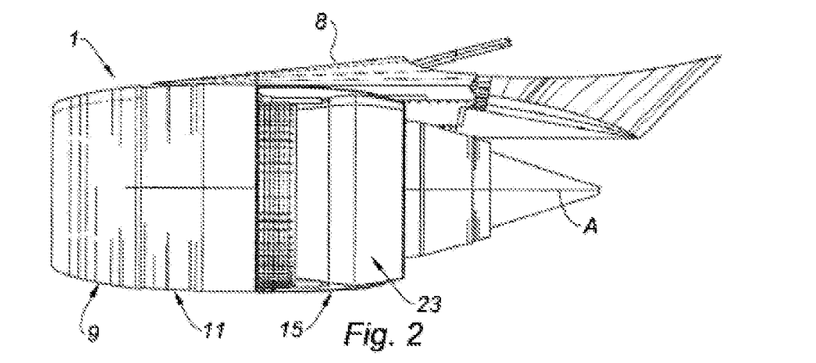
FIG. 2 is an overall diagrammatic illustration of the jet engine nacelle of FIG. 1, whereof the inside of the cowl of the reverser is shown transparently.
Figure 3:
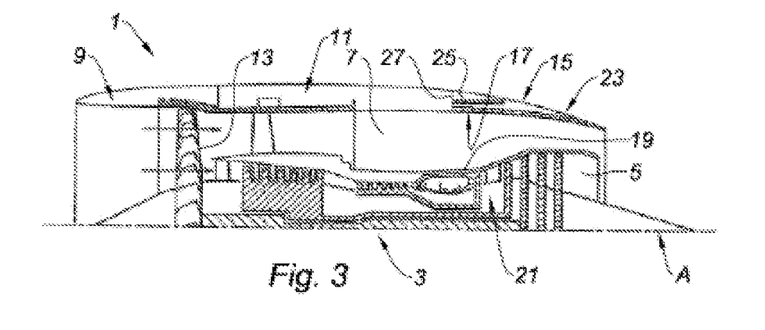
FIG. 3 is a longitudinal half-cross-sectional diagrammatic illustration of the nacelle of FIG. 1.

In reference to FIGS. 1 to 3, a nacelle 1 is designed to form a tubular housing for a dual flow jet engine 3 and serves to channel the hot 5 and cold 7 air flows created by that jet engine 3, as indicated in the preamble of this description.

This nacelle 1 is designed to be suspended from a pylon 8, which in turn is fixed under the wing of an aircraft.

As previously indicated, the nacelle 1 generally has a structure comprising an upstream section 9 forming an air intake, a middle section 11 surrounding the fan 13 of the jet engine 3, and a downstream section 15 surrounding the jet engine 3.

The downstream section 15 comprises an outer structure 17 including a thrust reverser device and an inner fairing structure 19 of the motor 21 of the jet engine defining, with the outer structure 17, the tunnel for the cold flow 7, in the case of a dual flow jet engine nacelle as presented here.

The thrust reverser device comprises a cowl 23 mounted translatably in a direction substantially parallel to the longitudinal axis A of the nacelle 1.

This cowl 23 is capable of alternating between a closed position (position shown in FIGS. 1 to 3), in which it provides the aerodynamic continuity of the lines of the downstream section 15 of the nacelle 1 and covers the airflow deflecting vanes 25, and an open position in which it opens a passage in the nacelle 1 by exposing said deflecting vanes 25.

More specifically, in one preferred form of the present disclosure, the moving cowl 23 is a single piece, i.e., it comprises only one single-piece movable cowl, with a quasi-annular shape, extending from one side of the pylon 8 to the other without interruption (so-called "O-duct" movable cowl).

The deflecting vanes 25 each have a plurality of deflecting blades.

As illustrated in FIG. 3, the downstream section 15 may furthermore comprise a front frame 27 that extends the cowl 23 in the upstream direction and may attach the downstream section 15 to the middle section 11 surrounding the fan 13 of the jet engine.

The translation of the movable cowl 23 in the downstream direction of the nacelle frees an opening therein through which the cold flow of the jet engine may escape at least partially, said flow portion being reoriented toward the front of the nacelle by the deflecting vanes 25, thereby creating a counter-thrust capable of contributing to the braking of the aircraft.

The cold flow is oriented toward the deflecting vanes 25 by a plurality of reverser flaps (not shown), for example distributed inside the movable cowl 23 or on the inner circumference of said movable cowl 23, each mounted pivoting between a retracted position and a deployed position in which, in a thrust reversal situation, they at least partially close said tunnel and deflect the cold flow through the deflecting vanes 25.

More specifically, in the form illustrated in FIGS. 1 to 3, the deflecting vanes 25 may be of the retractable type, i.e., they are capable of sliding from an upstream position to a downstream position under the effect of the opening of the movable cowl 23, and conversely, from the downstream position to an upstream position.

In a known manner, the downstream sliding movement of the deflecting vanes 25 is done by abutments positioned suitably on the upstream edge of the outer wall of the movable cowl 23.

More specifically, the thrust reverser flaps are each mounted pivoting and sliding inside grooves secured to the deflecting vanes 25.

A first linking rod connects the pivoting and sliding end of each flap to the stationary front frame 27, and a second connecting rod is articulated on the one hand substantially midway on the length of the thrust reverser flap, and on the other hand in the upstream area of the thrust reverser vanes 25.

When the movable cowl 23 goes from a direct jet position, in which it covers the deflecting vanes 25, to an intermediate position before thrust reversal, the two linking rods and the associated thrust reverser flap remain immobile, allowance the thrust reverser flap to leave the cavity defined by the outer and inner walls of the movable cowl 23.

When the movable cowl 23 continues its sliding to reach the reverse jet position or the flaps close the cold flow tunnel 7, the abutments positioned on the upstream edge of the outer wall of said movable cowl result in causing the thrust reverser vanes 25 to slide toward a downstream position.

Under the effect of this sliding, the first linking rod results in causing the articulation point of the end of the thrust reverser flap to slide inside the groove, allowing said thrust reverser flap to be removed from the cavity defined by the walls.

The second linking rod results in causing the thrust reverser flap to pivot to its position closing the cold flow 7 tunnel making it possible to orient said cold flow through the thrust reverser vanes 25, toward the upstream direction of the nacelle 1.

Figure 6:
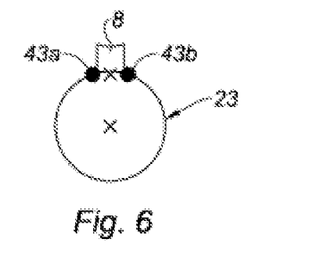
FIG. 6 diagrammatically shows, in transverse cross-section, the positioning of the two actuators of the movable cowl of the thrust reverser.

The actuating means for the movable cowl 23, making it possible to cause the latter to slide from one to the other of the positions, are shown diagrammatically in FIG. 6.

In one non-limiting form of the present disclosure, these means comprise two actuators 43a and 43b positioned in the upper part of the moving cowl (i.e., toward the top of drawing sheet 2/4 appended hereto), at 12 o'clock, on either side of the suspension pylon 8.

These actuators 43a and 43b will be described in more detail in reference to FIGS. 7 to 10.

Figure 4:
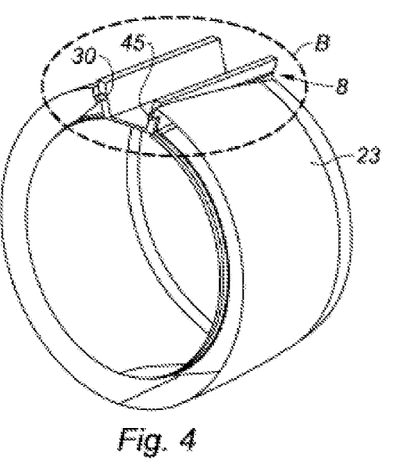
FIG. 4 is a perspective view of the cowl of FIG. 1 mounted on an aircraft pylon.
Figure 5:
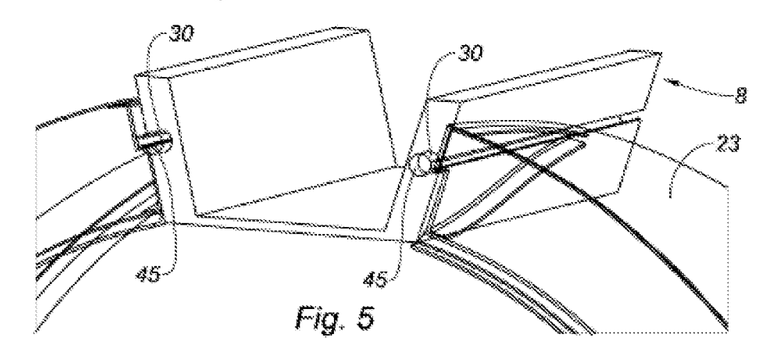
FIG. 5 is an enlarged area B of FIG. 4.

In reference to FIGS. 4 and 5, longitudinal rails 45 are positioned in the upper part of the movable cowl 23, at both ends of the cowl designed to be mounted on the suspension pylon 8.

These rails are suitable for allowing sliding of the cowl 23 in two longitudinal slideways 30 extending along the longitudinal axis of the nacelle that are formed, in one alternative form, on either side of the lateral ends of a part mounted on the suspension pylon 8.

Figure 14A:
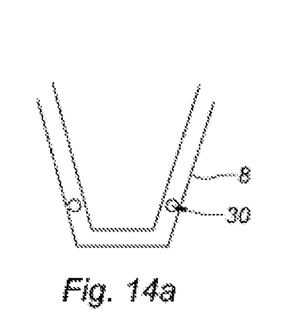
FIGS. 14a and 14b are cross-sectional views of two forms of suspension pylons.
Figure 14B:
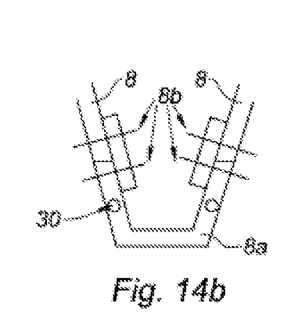

As illustrated in FIG. 14b, this part is a profile extending along the longitudinal axis of the nacelle, which may have a U-shaped transverse section complementary to that of the pylon 8, this profile 8a forming a base for the pylon 8.

This profile 8a is fixed to the pylon 8 using suitable fastening means.

In one non-limiting example, these may be screwing means.

The slideways 30 may be formed in the branches of the U extending in a plane comprising the longitudinal axis of the nacelle, as illustrated in FIG. 14b.

In one alternative form illustrated in FIG. 14a, two slideways 30 are formed directly on the lateral ends of the suspension pylon 8 across from the ends of the cowl 23, on either side of the pylon 8.

One source of the risks of jamming of the rails 45 of the movable cowl 23 in their associated slideways 30 is the upwardly offset position of the actuators 43a and 43b, i.e., their significantly skewed position relative to a horizontal plane intersecting the nacelle: such a skewed position is in fact an intrinsic source of buckling forces between the rails 45 of the movable cowl 23 and their associated slideways 30, this buckling being able to cause friction that can result in blockage situations.

Figures 7, 8A, 8B, 9:
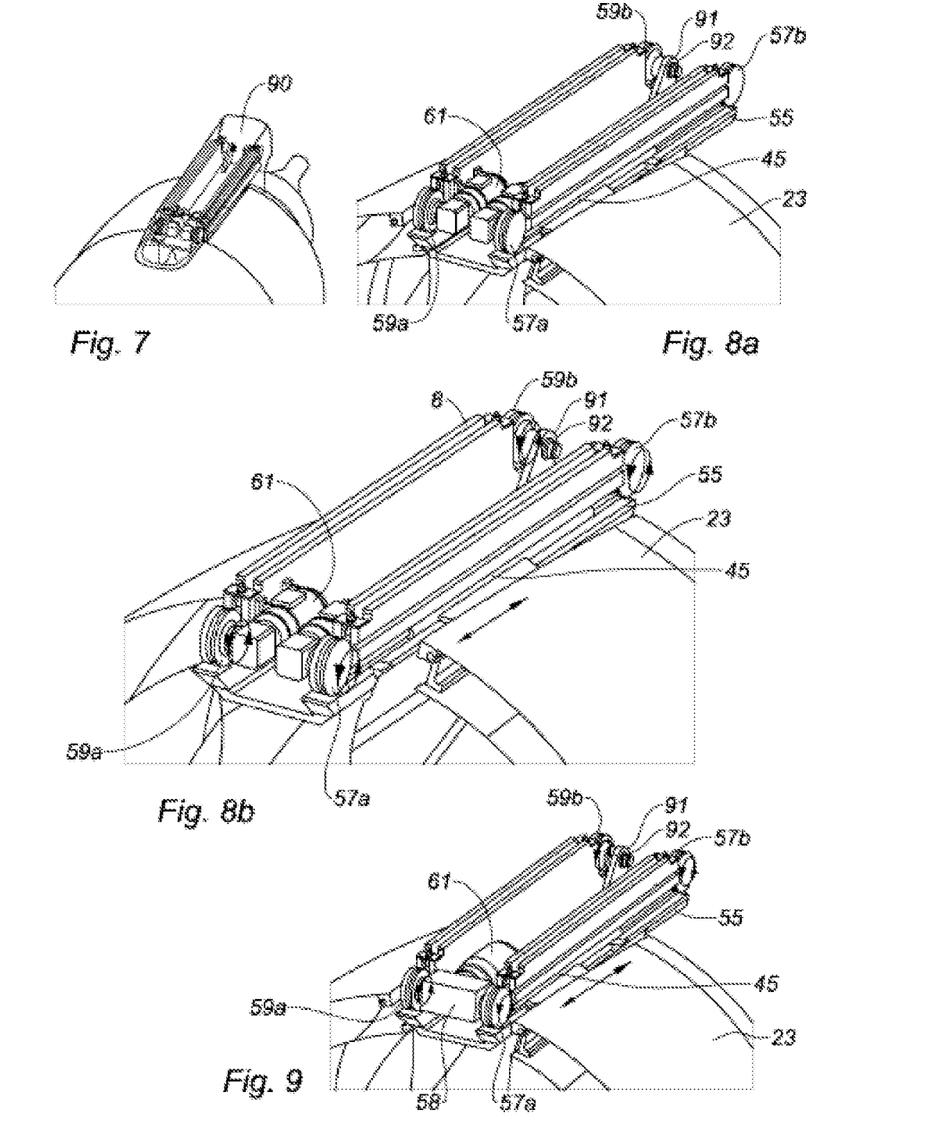
FIG. 7 is a perspective view of a first form of an actuator of a thrust reverser according to the present disclosure, mounted in an aircraft pylon.
FIGS. 8a and 8b are perspective views of the actuator of FIG. 7 idle and during operation to move the cowl of FIG. 1, respectively.
FIG. 9 is a perspective view of one alternative form of the actuator of FIG. 8b.
Figure 10A:
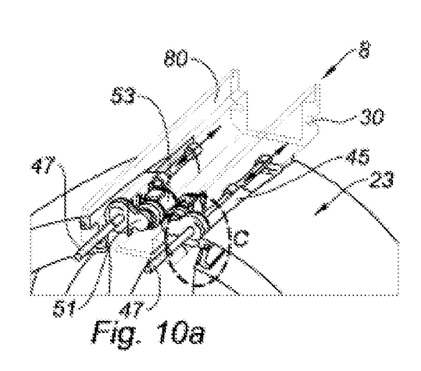
FIGS. 10a and 10b are perspective views of a second form of an actuator of a thrust reverser according to the present disclosure, mounted in an aircraft pylon, illustrated during operation to move the cowl of FIG. 1.

To reduce this risk of blockage caused by such buckling, each actuator 43a and 43b is placed in the extension of the associated rail 45 of the movable cowl 23, as shown in particular in FIGS. 8a and 10a.

In a first form illustrated in FIGS. 10a, 10b, 11 to 13, each actuator 43a and 43b is a linear actuator with an endless screw and a rotating nut.

Figure 10B:
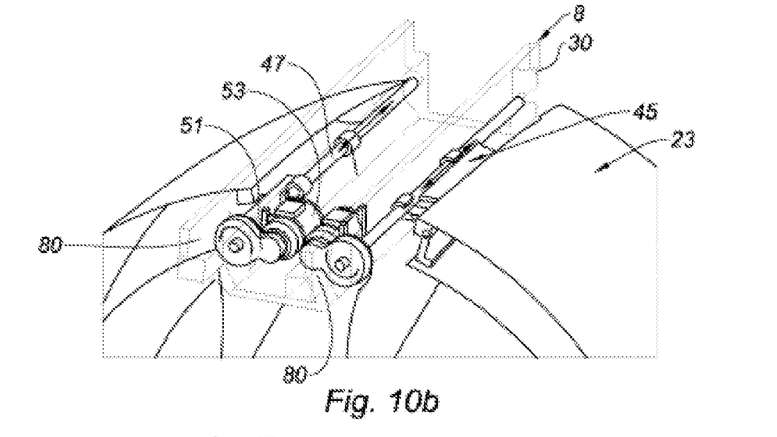
Figure 11:
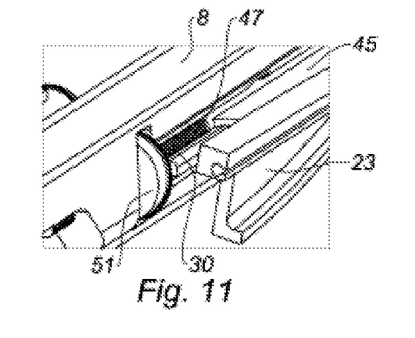

Such an actuator 43 comprises a rotating nut 51 mounted rotatably around the longitudinal axis of the nacelle and driven by electric or hydraulic motor 53.

This nut 51 is mounted in a suitable housing on one of the lateral branches 80 of the profile mounted on the suspension pylon 8 or directly on one of the branches 80 of the pylon 8, upstream from the slideway 30 cooperating with the corresponding rail 45 to be moved.

The motor 53 may be positioned in the profile attached to the pylon or directly to the pylon 8, upstream from the slideway 30 cooperating with the rail 45. As illustrated in FIGS. 10a, 10b, the motor may be housed in the concavity of the pylon 8 oriented toward the outside of the nacelle.

The actuator further comprises a translatable endless screw 47 provided with a threaded portion, so as to be suitably coupled with the rotating nut 51.

This screw 47 extends along the longitudinal axis of the nacelle upstream from the rail 45 to be moved, said rail being secured to a movable part of the cowl 23. More particularly, the screw 47 is aligned with said rail 45.

Figure 12:
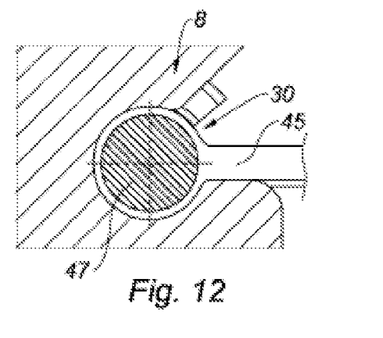

More specifically, as illustrated in FIG. 12, the screw 47 and the rail 45 are coaxial and the endless screw 47 is connected to the associated rail 45 by connecting means able to allow a slight angular offset of said screw 47 relative to said rail 45, by ensuring rotational blocking of said two parts relative to one another.

The screw 47 and the rail 45 may also be made in the same part.

The sliding movement of the rail 45 relative to its associated slideway 30 and, consequently, of the cowl 23, is provided by the endless screw 47, the translation of which is in turn provided by the rotating nut 51 engaged with the pitch of said screw 47, and driven by the motor 53.

Thus, the endless screw 47 is fixed in rotation owing to its connection with the corresponding rail 45 and its translation relative to the pylon 8 provides the translational movement of the cowl 23 upstream and downstream from the nacelle, between its open and closed positions owing to the rotation of the nut 51 driven by the motor 53, said nut 51 being fixed in translation relative to the pylon 8.

Figure 13:
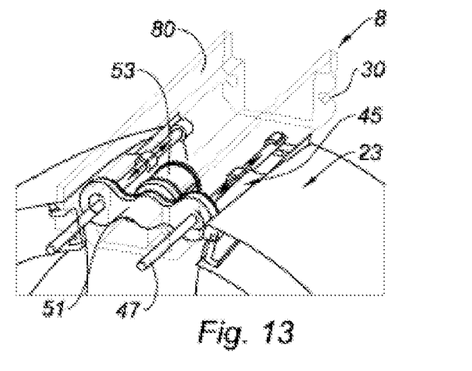

In another alternative form illustrated in FIG. 13, a single motor 53 can rotate several nuts 51 of several facing actuators, owing to a suitable driving system, as illustrated in the figure for the case of two actuators comprising a single electric or hydraulic motor 53.

Furthermore, a so-called backup motor may also be provided.

Additionally, a pitch difference between the two nuts 51 rotated by the single motor 53 is necessary, in the single-motor configuration (with or without backup motor).

It is also possible to provide end-of-travel abutments (not shown) between the two extreme positions of the endless screw 47 corresponding to the closed and open positions of the cowl 23.

It should be noted that the movement of the nut 51 is reversible. In fact, the direction of the translational movement of the endless screw 47 depends on the direction of the rotation of the motor 53.

With this particular arrangement, the thrust and traction forces exerted by the actuators 43a and 43b are exerted directly in the sliding axis of each rail 45 with the corresponding slideway 30, thereby reducing the tilting movements and the associated risks of buckling and jamming.

In one alternative form not shown, the slideways 30 may be formed on the cowl 23, while the rails 45 are formed on the pylon 8 or the profile attached to the pylon 8.

In this alternative form, the motor(s) 53 driving the nut(s) 51 may be mounted on the inner structure of the cowl 23.

In the second form illustrated in FIGS. 7 to 9 suitable for reducing these risks of buckling and jamming, it is possible to use actuators 43 suitable for pulling on the rails 45 relative to the associated slideways 30 to cause the cowl 23 to slide between its open and closed positions.

In one non-limiting example form, each actuator 43 comprises a pulley-cable system.

This pulley-cable system may be covered by a suitable protective fairing 90, as illustrated in FIG. 7.

More specifically, at least one cable 55 is fixed to each rail 45 of the movable cowl 23, said cable 55 passing around two upstream and downstream pulleys 57a and 57b respectively mounted on either side of the rail 45 over a distance corresponding at least to the distance the rail 45 is intended travel, during the movement of the movable cowl 23 between its closed and open positions, as illustrated in particular in FIGS. 8a and 8b.

It should be noted that the term "cable" used in this description defines cables, but also all equivalents suitable for cooperating with the pulleys and moving the cowl. Thus, non-limiting examples of the cable include any chain, rope or belt.

More specifically, the cables 55 are housed in the longitudinal slideways 30 extending along the pylon 8, the slideways 30 being formed on the branches 80 of the profile mounted on the suspension pylon 8 or directly on the pylon 8.

The upstream and downstream pulleys 57a, 57b may traditionally assume the form of a wheel with a hollowed groove intended to receive the corresponding cable 55 to transmit the movement from the cable 55 to the concerned rail.

In one example form, the upstream and downstream pulleys 57a and 57b are mounted, similarly to the cables 55, on the branches 80 of the profile mounted on the suspension pylon 8 or directly on the pylon 8.

In an actuator, one of the upstream and downstream pulleys 57a or 57b is free, while the other is driven by an electric or hydraulic motor 61 that can also be housed in the profile 8a, attached to the suspension pylon 8 or directly to the pylon 8.

Each pulley 57a or 57b is rotatably mounted around an axis that may be perpendicular to the longitudinal axis of the nacelle to provide movement of the cowl 23 and translation along said axis of the nacelle.

The free pulley 57b may be fixed on the profile 8a secured to the pylon 8 or directly on the pylon 8 by means of fastening lugs 91, comprising an orifice 92 suitable for cooperating with the corresponding pulley, the latter being fixed to the lug by suitable fastening means, as illustrated in FIG. 8a.

Furthermore, a corner guide may be provided between each pulley 57a, 57b and the associated motor 61.

Preferably, in one alternative form illustrated in FIG. 9, a single motor 61 is necessary to drive the pulleys 57, 59 of the set of facing actuators 43.

As illustrated in FIG. 9, the motor 61 thus drives another upstream pulley 59a, 59b positioned across from the upstream pulley 57a, and driving the other rail 45 of the moving cowl 23.

A drive shaft 58 is then provided connecting the pulleys 57a and 59a driven by the electric or hydraulic motor 61.

The motor(s) may indifferently drive the front 57a, 59a or rear 57b, 59b pulleys of one and/or several actuators.

It may also be considered to drive the upstream pulley of one actuator and the downstream pulley of the other with a single motor 61.

More generally, several pulleys may be provided at each end of the rail 45 of the movable cowl 23, in order to provide a circuit for the cable 55 different from that shown in the figures.

In one non-limiting example, the pulleys may be mounted such that the circuit formed by the cable 55 is deviated within the pylon 8 or the profile 8a fixed to the pylon 8.

This particular mechanism also makes it possible to exert actuating forces on each rail 45 precisely in the axis of that rail, thereby making it possible to reduce the risks of buckling and jamming that may result therefrom.

Furthermore, a stretching device, illustrated in FIGS. 8a, 8b and 9 by stretcher rollers, may be provided to keep said cable(s) 55 stretched, during the movement of the rails 45 and the cowl 23.

The cables 55 used in this type of actuator may be made from a metal or synthetic material.

In one alternative form not shown, the slideways 30 and the pulleys 57, 59 may be formed on the cowl 23, while the rails 45 are formed on the pylon 8 or the profile attached to the pylon 8.

In this alternative form, the motor(s) 61 may be fixed on the inner structure of the cowl 23. Power may for example be transmitted to the cowl using slippers.

However, a manner complementary to the preceding methods for reducing the tilting torque of the movable cowl 23 consists of using the thrust reverser flaps themselves.

More specifically, it is possible to choose the geometry of the movement of the thrust reverser flaps such that they abut against the upstream edge of the inner wall of the movable cowl 23.

In this way, these thrust reverser flaps, under the effect of the thrust exerted by the cold flow, press on the entire circumference of the upstream edge of the inner wall, exerting a circumferentially distributed thrust force on that inner wall and therefore on the entire movable cowl 23.

The circumferential distribution of the force makes it possible to counter the tilting torque created by the asymmetrical positioning of the actuators 43a and 43b, and thus actively contributes to reducing the risks of subsequent buckling and jamming.

As can be seen in light of the preceding, the present disclosure provides a thrust reverser with a design offering a solution to the tilting torques created by the forces generated by the actuators, during opening and closing of the movable cowl.

To resolve these difficulties, the aforementioned actuators 43 are used, alone or in combination, making it possible to compensate the tilting forces of the movable cowl of the first reverser.

It will be noted that the number of actuators is not limited to a particular number.

It is thus possible to provide, in non-limiting examples of the present disclosure, more than one actuator on each side of the suspension pylon 8, without going beyond the scope of the present disclosure.

It will also be noted that the use of a thrust reverser with retractable means is completely optional in the context of the present disclosure, but that such use contributes to reducing the tilting forces of the movable cowl: the presence of retractable vanes in fact makes it possible to reduce the length of the movable cowl 23.

Of course, the present disclosure is in no way limited to the described and illustrated forms, which have been provided purely as an illustration.

What is claimed is:

1. An assembly comprising a suspension pylon and a thrust reverser comprising vanes for deflecting an air flow and a cowl able to move between an open position releasing said vanes and a closed position covering said vanes and furthermore comprising rails able to slide in slideways, the rails being mounted on said cowl or on either side of the suspension pylon, and the slideways being mounted on either side of the suspension pylon or on said cowl, wherein the thrust reverser comprises at least one actuator able to slide the cowl between the open and closed positions, the at least one actuator being disposed along a sliding axis and in line with a corresponding rail such that forces exerted by the at least one actuator are exerted directly along the sliding axis of the corresponding rail, said at least one actuator being:
   either an actuator having a rotating nut connected to an endless screw, for sliding the corresponding rail or a corresponding slideway,
   or an actuator suitable for pulling on the corresponding rail or on the corresponding slideway.

2. The assembly according to claim 1, wherein the slideways or the rails, are formed on a profile fixed to the suspension pylon forming a base of the suspension pylon, or on the suspension pylon.

3. The assembly according to claim 2, wherein the actuator having the rotating nut is connected to an upstream end of the corresponding rail of the cowl or the corresponding slideway.

4. The assembly according to claim 3, wherein each rotating nut is driven by a dedicated driving motor.

5. The assembly according to claim 1, the rotating nut engaged with said endless screw is able to rotate around a longitudinal axis of the thrust reverser under an action of a driving motor, the endless screw being capable of translating along said longitudinal axis, the endless screw's movement being provided by the rotation of said rotating nut.

6. The assembly according to claim 5, wherein an assembly formed by the driving motor and the rotating nut is mounted in a profile fixed to the suspension pylon or the assembly is mounted in the suspension pylon.

7. The assembly according to claim 5, wherein an assembly formed by the endless screw and the driving motor is mounted on the cowl.

8. The assembly according to claim 5, wherein a single driving motor is capable of driving the nuts of several actuators.

9. The assembly according to claim 1, wherein each actuator capable of pulling on the corresponding rail or on the corresponding slideway to slide the cowl between the open and closed positions comprises at least one upstream pulley and one downstream pulley respectively mounted on either side of the corresponding rail or the corresponding slideway, each pulley being capable of rotating along an axis that is perpendicular to a longitudinal axis of a nacelle under an action of at least one driving motor, and a movement transmission element suitable for transmitting rotational movement from the pulleys to said rail or to said slideway.

10. The assembly according to claim 9, wherein the at least one upstream pulley and the at least one downstream pulley and the at least one driving motor are mounted in a profile fixed to the suspension pylon or directly to the suspension pylon.

11. The assembly according to claim 9, wherein the at least one pulley and the at least one driving motor are mounted in the cowl.

12. The assembly according to claim 9, wherein a single driving motor is capable of driving the at least one upstream pulley and/or the at least one downstream pulley of several actuators.

13. The assembly according to claim 9, wherein the at least one driving motor indifferently drives the at least one upstream pulley or the at least one downstream pulley of one and/or several actuators.

14. The assembly according to claim 1, wherein the cowl is a single piece.

15. An assembly comprising a suspension pylon and a thrust reverser, the thrust reverser comprising:
vanes for deflecting an air flow;
a cowl able to move between an open position releasing said vanes and a closed position covering said vanes by at least one actuator; and
rails able to slide in slideways, the rails being mounted on said cowl or on either side of the suspension pylon, and the slideways being mounted on either side of the suspension pylon or on said cowl,
wherein the at least one actuator is disposed along a sliding axis and in line with a corresponding rail such that forces exerted by the at least one actuator are exerted directly along the sliding axis of the corresponding rail, and the slideways or the rails are formed on either side of lateral ends of a part mounted on the suspension pylon.

* * * * *